(12) United States Patent
Vengroff et al.

(10) Patent No.: US 8,311,845 B2
(45) Date of Patent: Nov. 13, 2012

(54) PAY-FOR-VISIT ADVERTISING BASED ON VISITS TO PHYSICAL LOCATIONS

(75) Inventors: Darren E. Vengroff, Seattle, WA (US); Jeffrey A. Holden, Seattle, WA (US)

(73) Assignee: Groupon, Inc., Chicago, IL (US)

( * ) Notice: Subject to any disclaimer, the term of this patent is extended or adjusted under 35 U.S.C. 154(b) by 1741 days.

(21) Appl. No.: 11/404,102

(22) Filed: Apr. 13, 2006

(65) Prior Publication Data

US 2007/0185768 A1    Aug. 9, 2007

Related U.S. Application Data

(63) Continuation-in-part of application No. 11/400,798, filed on Apr. 7, 2006, now abandoned.

(60) Provisional application No. 60/771,083, filed on Feb. 7, 2006.

(51) Int. Cl.
*G06Q 30/00* (2012.01)
(52) U.S. Cl. ............ 705/1.1; 705/14.4; 705/14.47; 705/14.72; 705/67; 705/44
(58) Field of Classification Search .............. 705/14.4, 705/1.1, 44, 50–79; 713/155, 170
See application file for complete search history.

(56) References Cited

U.S. PATENT DOCUMENTS

| | | | |
|---|---|---|---|
| 7,188,177 B2 * | 3/2007 | Taylor | 709/227 |
| 7,314,162 B2 * | 1/2008 | Carr et al. | 235/379 |
| 7,447,508 B1 | 11/2008 | Tendler | |
| 7,890,393 B2 * | 2/2011 | Talbert et al. | 705/35 |
| 2002/0102993 A1 * | 8/2002 | Hendrey et al. | 455/456 |
| 2002/0164995 A1 | 11/2002 | Brown et al. | |
| 2002/0183072 A1 | 12/2002 | Steinbach et al. | |
| 2003/0220114 A1 * | 11/2003 | Langensteiner et al. | 455/450 |
| 2003/0225686 A1 * | 12/2003 | Mollett et al. | 705/38 |
| 2004/0078340 A1 * | 4/2004 | Evans | 705/64 |
| 2004/0111184 A1 | 6/2004 | Chiappetta et al. | |
| 2005/0222908 A1 * | 10/2005 | Altberg et al. | 705/14 |
| 2005/0228719 A1 | 10/2005 | Roberts et al. | |
| 2005/0239495 A1 | 10/2005 | Bayne | 455/550.1 |
| 2005/0245241 A1 | 11/2005 | Durand et al. | |
| 2006/0004627 A1 | 1/2006 | Baluja | |
| 2006/0153346 A1 * | 7/2006 | Gonen et al. | 379/88.17 |
| 2008/0156869 A1 * | 7/2008 | Carr et al. | 235/380 |
| 2008/0280624 A1 * | 11/2008 | Wrappe | 455/456.1 |

FOREIGN PATENT DOCUMENTS

| | | |
|---|---|---|
| JP | 2001343249 | 12/2001 |
| JP | 2002-056283 | 2/2002 |
| JP | 2003-006509 | 1/2003 |
| JP | 2003196535 | 7/2003 |

(Continued)

*Primary Examiner* — Khanh H Le
(74) *Attorney, Agent, or Firm* — Seed IP Law Group PLLC

(57) ABSTRACT

A method and system for providing a pay-for-visit billing model for advertisements is provided. The advertisement system provides advertisements that have associated physical visit locations. The advertisement system provides advertisements to a mobile device or fixed of a user when the user is in the vicinity of or examining locations in the vicinity of the visit location. If the user subsequently visits the visit location of the advertisement by physically going to the location, the advertisement system then bills the advertiser for the advertisement. The advertisement system bills the advertiser under the assumption that but for the advertisement, the user would not have visited the visit location.

29 Claims, 11 Drawing Sheets

FOREIGN PATENT DOCUMENTS

| | | |
|---|---|---|
| JP | 2003346052 A | 12/2003 |
| JP | 2005050222 | 2/2005 |
| JP | 2005115945 | 4/2005 |
| JP | 2005327073 | 11/2005 |

* cited by examiner

PAY-FOR-VISIT ADVERTISING BASED ON VISITS TO PHYSICAL LOCATIONS

CROSS-REFERENCE TO RELATED APPLICATION(S)

This application is a continuation-in-part of U.S. patent application Ser. No. 11/400,798, entitled "Pay-For-Visit Advertising Based on Visits to Physical Locations" filed on Apr. 7, 2006 now abandoned, which claims the benefit of U.S. Provisional Patent Application No. 60/771,083, entitled "Location-Based Pay-For-Performance Advertising Services," filed on Feb. 7, 2006, each of which is hereby incorporated by reference.

BACKGROUND

Many search engine services, such as Google and Overture, provide for searching for information that is accessible via the Internet. These search engine services allow users to search for web pages and other Internet-accessible resources that may be of interest to users. After a user submits a search request that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on.

Some search engine services attempt to tailor the search result based on the location of the user; such search engine services are referred to as location-based search engine services. Location-based search engine services can provide services to users based on the location of stationary and mobile devices. When a device is stationary, the location-based search engine services may use the Internet protocol ("IP") address or domain name to identify the physical location of the stationary device, may prompt the user to indicate a location, and so on. When a device is mobile, location-based search engine services may use cellular tower triangulation of the mobile device, GPS coordinates provided by the mobile device, and so on to identify the location of the mobile device. Some location-based search engine services focus on providing their services to mobile devices. These location-based search engine services may provide maps to help a user locate a nearby destination. For example, when a user enters the search term "restaurant," the search engine service may provide to the mobile device a map of the area surrounding the user along with an indication of the location of various restaurants.

Some search engine services do not charge a fee to the providers of web pages for including links to their web pages in search results. Rather, the search engine services obtain revenue by placing advertisements along with search results. These paid-for advertisements are commonly referred to as "sponsored links," "sponsored matches," or "paid-for search results." A vendor who wants to place an advertisement along with certain search results provides a search engine service with an advertisement, a monetary bid, and search terms. When a search request is received, the search engine service identifies the advertisements whose search terms most closely match those of the search request. The search engine service then displays those advertisements along with the search results. The search engine service typically selects to display those advertisements belonging to the advertisers that have offered to pay the highest price (e.g., placed the highest bid) for their advertisement. The search engine services can either charge for placement of each advertisement along with search results (i.e., pay-per-impression billing model), charge only when a user actually selects a link associated with an advertisement (i.e., pay-per-click billing model), or charge only when a user calls a phone number presented in the advertisement (pay-for-call billing model).

Advertisements can be provided to users based on a "pull" model or "push" model. The advertising that accompanies conventional search results follows the pull model in the sense that the advertising is provided in response to a user submitting a query and thus "pulling" the advertisements. With the push model, advertisements are provided to a user independently of their interactions with their device. In particular, some advertising systems detect the location of a mobile device and send or "push" advertisements to those mobile devices that are appropriate for the location. For example, an advertising system may send to the mobile device of a user a short message service ("SMS") message that indicates a coffee shop one block away will sell them a coffee drink for half price in the next 10 minutes. The push and pull models typically use either a pay-per-impression or pay-per-click billing model as appropriate. For example, an advertising system that sends location-based advertisements via SMS messages may use the pay-per-impression billing model, whereas an advertising system that provides sponsored links along with a search result may use the pay-per-click billing model.

DETAILED DESCRIPTION

Figure 1:
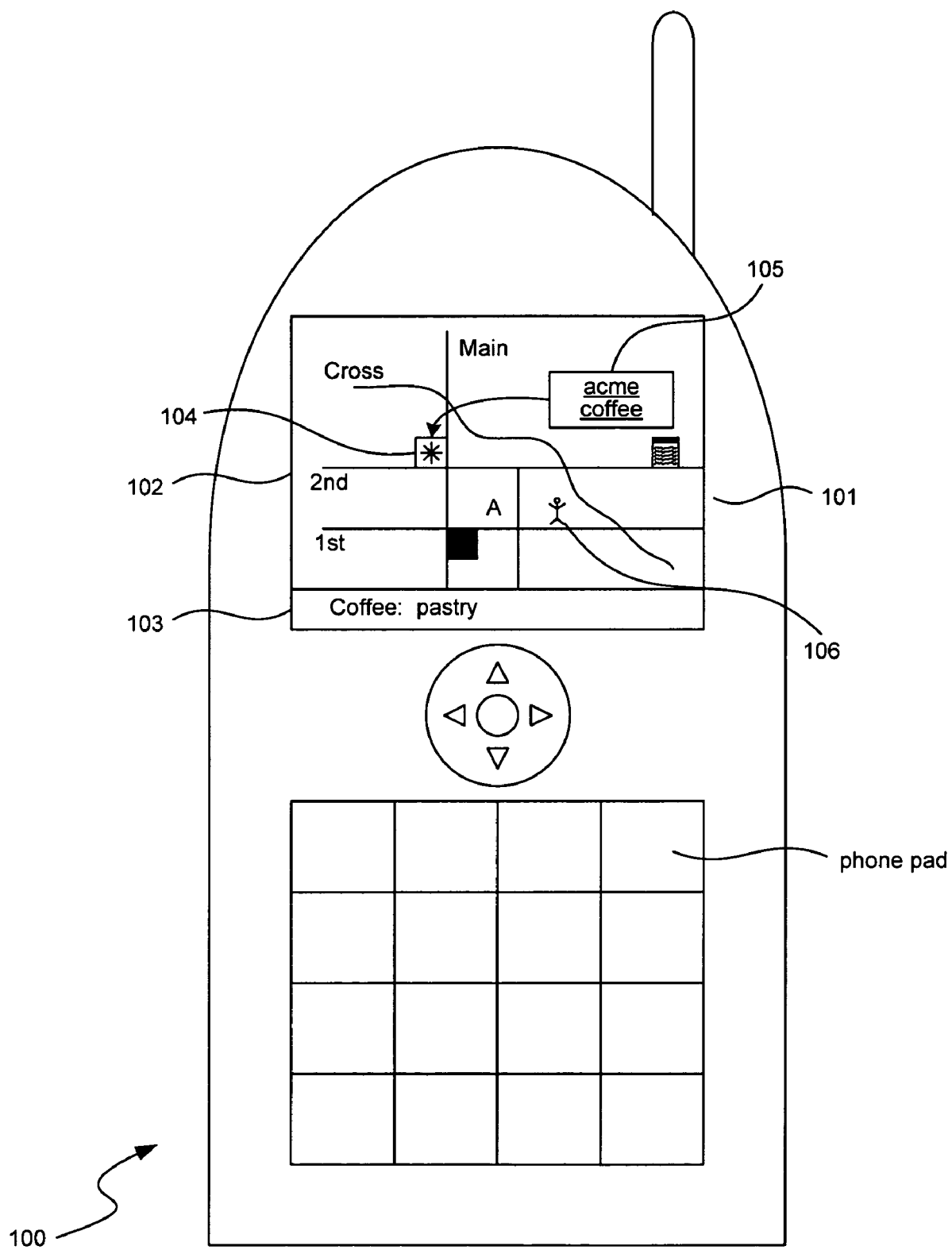
FIG. 1 is a diagram that illustrates a mobile device that interacts with the advertisement system in one embodiment.

A method and system for providing a pay-for-visit billing model for advertisements is provided. In one embodiment, the advertisement system provides advertisements that have associated physical visit locations. The visit location of an advertisement is the physical location to which the advertiser is attempting to attract a customer via the advertisement. For example, an advertisement for a coffee shop may have a visit location that represents the area of the coffee shop (e.g., as defined by its perimeter). The advertisement system typically provides advertisements to the mobile device of a user when the user is in the vicinity of the visit location. For example, a user may enter a search request to identify the coffee shops within the vicinity of their current location as indicated by the location of the mobile device. The advertisement system may provide to the mobile device of the user a search result that includes an advertisement for a coffee shop. If the user subsequently visits the visit location of the advertisement by physically going to the location, the advertisement system then bills the advertiser for the advertisement. For example, if the user who was presented the advertisement for the coffee shop goes to the coffee shop, the advertisement system detects, based on the location of the mobile device, that the user has visited the visit location of the advertisement. The advertisement system bills the advertiser under the assumption that but for the advertisement, the user would not have visited the visit location. The advertisement system may place a time restriction on the visit to ensure a nexus between the advertisement and the visit. For example, if a user is presented an advertisement for a coffee shop and visits the coffee shop within 10 minutes, then the nexus between the advertisement and the visit is sufficient to charge the advertiser. If, however, the user does not visit that coffee shop until one month later, then the nexus may not be sufficient to charge the advertiser. The maximum time between presenting an advertisement and the visit that is sufficient to establish a nexus is referred to as the "visit window." In this way, advertisers can be assured that they are only billed for the customer traffic resulting from the advertisements. As used in this description, the term "pay-for-visit" refers to a billing model in which an advertiser is billed for an advertisement when a user visits the physical visit location associated with the advertisement.

In one embodiment, the advertisement system may provide advertisements to a location-based search engine that presents maps of locations of interest to users. The location-based search engine may provide a user interface for a mobile device through which a user can enter a query that includes a search term and/or a search category. For example, a search category may be "coffee shops" and a search term may be "pastry." The search engine service may provide a hierarchical organization of the categories and a user interface for browsing through and selecting a category. When a user submits a query, the mobile device forwards the query to the search engine. The search engine identifies the user location based on the location of the user's mobile device and identifies locations of interest near the user's location that match the query. For example, for the query "coffee shops: pastry," the search engine may identify several coffee shops that sell pastries and a doughnut shop that sells coffee within a five-block radius of the user location. The search engine then requests the advertisement system to provide an advertisement that is appropriate for the user, the user's location, and the query. For example, the advertisement system may provide an advertisement for the "Acme Coffee Shop" that is located two blocks from the user. The search engine may then provide to the user's mobile device a map showing the identified locations of interest with the visit location of the advertisement highlighted. When the user selects the highlighted location (e.g., by hovering over it with a pointer or by pressing a button on the device corresponding to a label on the location on the map), the mobile device may display more detailed information about the advertiser such as directions to the visit location. If the user travels to that visit location, as indicated by the location of their mobile device within the visit window, then the advertisement system charges the advertiser or some other third party for the advertisement.

In one embodiment, the advertisement system may provide advertisements that are appropriate for a user-specified location and/or time. For example, a user may be planning to travel to a distant city and may want to select a restaurant in advance. The user may input via their mobile device a query "Italian restaurants" with a location indicated by the 98101 zip code and a time indicated by 6 PM on July $5^{th}$. A search engine may identify Italian restaurants within the area of the zip code and provide a map of the restaurants to the user. The search engine may request the advertisement system to select an advertisement that is appropriate for that query, location, and time. For example, if a restaurant is only open for lunches it may not want to provide its advertisements when the user-specified time is much later than lunch. In such a case, the advertisement system may use an extended visit window that extends from the current time to the user-specified time. The advertisement system may also define the visit window to include only a short time period before and after the user-specified time.

In one embodiment, the advertisement system reconciles the advertisements presented to the users and travel paths of the users to determine whether the users visited the visit locations within the visit window. To support the reconciliation, the advertisement system may maintain an impression log that has an entry for each advertisement presented to a user. Each entry may identify the user, the advertisement, the visit location, and the presentation time. The advertisement system may also track the travel path of each user. The advertisement system may receive from the users' mobile devices their current locations at various times. The advertisement system stores the time and location pairs as a travel log for each user. The advertisement system reconciles the impressions with the travel paths by analyzing the travel log of a user to determine whether the user traveled to the visit location of a presented advertisement within the visit window. If so, the advertisement system records an indication of a payable visit. The advertisement system then bills the advertiser based on the payable visits resulting from its advertisements. The reconciliation component of the advertisement system may be implemented on an advertisement server or on a mobile device. If implemented on an advertisement server, the advertisement system may periodically (e.g., daily) execute the reconciliation component to perform the reconciliation based on travel log information collected from mobile devices. If implemented on the mobile devices, components of the advertisement system residing on a server may provide to the mobile devices the visit location and the visit window along with each advertisement. The reconciliation component implemented at the mobile device compares the locations of the mobile device to the visit location to determine whether the mobile device is at the visit location within the visit window. If so, the mobile device notifies the advertisement server that a payable visit has occurred.

In one embodiment, the advertisement system selects advertisements to present to users based on analysis of advertiser-specified advertisement plans and advertisement system goals. An advertisement plan includes an advertisement identifier, a visit location, a bid amount, and placement criteria for presenting an advertisement to a user. The placement criteria may include user location, search terms, search categories, user demographics, search time, mobile device type, and so on. When the advertisement system is presented with an advertisement opportunity, the advertisement system identifies the advertisements whose placement criteria indicate that the advertisement is a candidate advertisement that can be presented to the user. The advertisement system may then identify which of the candidate advertisements is most likely to help achieve a goal of the advertisement system (e.g., maximize profits). The advertisement system may factor in various considerations when determining which candidate advertisement to select for presentation. For example, the advertisement system may consider an anticipated advertisement conversion rate (e.g., likelihood that the user will visit the visit location), bid amount of the advertisements, travel direction of the user, travel mode of the user (e.g., automobile, bicycle, or foot), historical patterns of the user, and so on. The advertisement system may factor in these various considerations in generating a goal score for each candidate advertisement that indicates its value in achieving the goal of the advertisement system. The advertisement system then selects to present the candidate advertisement with the highest goal score. The advertisement system may deactivate candidate advertisements whose goal scores are repeatedly too low to be selected for presentation. Such low goal scores may be an indication that the advertising plan is defective in some way (e.g., bid too low or user location too general).

In one embodiment, the advertisement system may provide an authentication process to ensure that advertisers do not fraudulently provide advertisements that are purportedly on behalf of another advertiser or provide misleading visit locations. For example, a fraud may occur when a person impersonates a legitimate advertiser and establishes an account with the advertisement system under the name of the advertiser. That person may then specify advertisements that are misleading or disparaging to the legitimate advertiser. Another fraud may occur when a merchant opens an account under their name but gives the visit location of a nearby business. For example, a merchant representing a coffee shop may give the location of the flower shop next door as the visit location for the merchant's advertisement. The merchant may provide the incorrect visit location in hopes of avoiding having to pay for all traffic generated from its advertisements. In such a case, the advertisement system would only bill the merchant for those users who visit the flower shop within the visit time of an advertisement. In certain situations, the advertisement conversion rate resulting from the visits to the flower shop may be high enough so that the advertisement system will still place advertisements on behalf of the coffee shop, but the merchant will be billed for a small percentage of the advertisements that would have resulted in a payable visit had the correct visit location been provided by the merchant. In some embodiments, the advertisement system will deactivate an advertisement if the percentage of payable visits resulting from presentation of that advertisement is below a threshold.

To help avoid such fraud, the advertisement system incorporates a confirmation step into the process of opening an account and/or specifying a visit location. The advertisement system allows an advertiser to open an account using a web interface that prompts the advertiser for typical account information such as business name, physical or visit location, billing location, electronic mail address, billing information, telephone number, and so on. The advertiser may be prompted to choose the visit location by selecting from a set of known business locations presented on a map. Before the opening is completed and the account activated, the advertisement system provides a confirmation code, which may be randomly generated, to the advertiser. The advertisement system then asks the advertiser to provide that confirmation code during a confirmation process in which the advertisement system places a call to the advertiser's business. Although the advertiser may provide a telephone number, the advertisement system does not rely on that telephone number as being accurate. Rather, the advertisement system identifies a telephone number based on the physical location of the business as provided by the advertiser. For example, the advertisement system may use various address-to-telephone number mappings to determine a telephone number associated with the address of the visit location. Alternatively, the advertisement system may use a phone number that was associated with the visit location provided by a business directory used to generate the map that shows known business locations. The advertisement system then places a call to that telephone number and prompts whoever answers to provide the confirmation code. If the advertiser is legitimate, then the advertiser provides the confirmation code and the advertisement system completes the opening of the account. If, however, the advertiser is trying to perpetrate a fraud, then the telephone number called will not be associated with the fraudulent advertiser. In such a case, the person who answers the call will be unaware of the attempt to open the account and will be unable to provide the confirmation code. Thus, the advertisement system will not complete the opening of the account with the incorrect and possibly fraudulent business location.

FIG. 1 is a diagram that illustrates a mobile device that interacts with the advertisement system in one embodiment. The mobile device 100 may be a cellular phone, a personal digital assistant, a tablet or notebook computer, a GPS-based device, and so on. The mobile device may include a display 101 through which the mobile device displays information to the user. The mobile device may initially display a query window to the user that allows the user to input a query that may include search categories and search terms. The mobile device transmits the query to the search engine using, for example, a text communications link (e.g., SMS) or a text or binary communication link using a protocol such as TCP/IP or HTTP. The mobile device may also include a GPS component or network-based location component for providing the user location to the search engine along with the query. In addition, the mobile device may include a location component that periodically determines the user location and current time and sends travel reports (e.g., location and time pairs) to the advertisement system. Upon receiving a query, the search engine generates a map of the area surrounding the user location and adds to the map locations that match the query. The advertisement system may also select an advertisement that matches the query that is near the user location and highlights the advertisement visit location on the map. The advertisement system then sends the generated map to the mobile device, which displays the map to the user. The display includes a map 102 and a query 103. In this example, the map includes highlighted location 104 corresponding to the visit location of the advertisement for the advertiser Acme Coffee. In one embodiment, when a user selects the highlighted location, the mobile device displays additional information 105 related to that location such as the name of the advertiser and directions to that location. In addition, the mobile device may display the current location 106 of the user on the map so that the user can easily see their location relative to the location of the advertiser. The advertisement system may overlay the map with the additional information or may provide visual controls with the map so that the user can control the display of this information. In other embodiments, the mobile device may provide a text-based user interface in which locations of interest are displayed in text in a manner similar to how a conventional search engine displays links to web pages as its search result.

Figure 2:
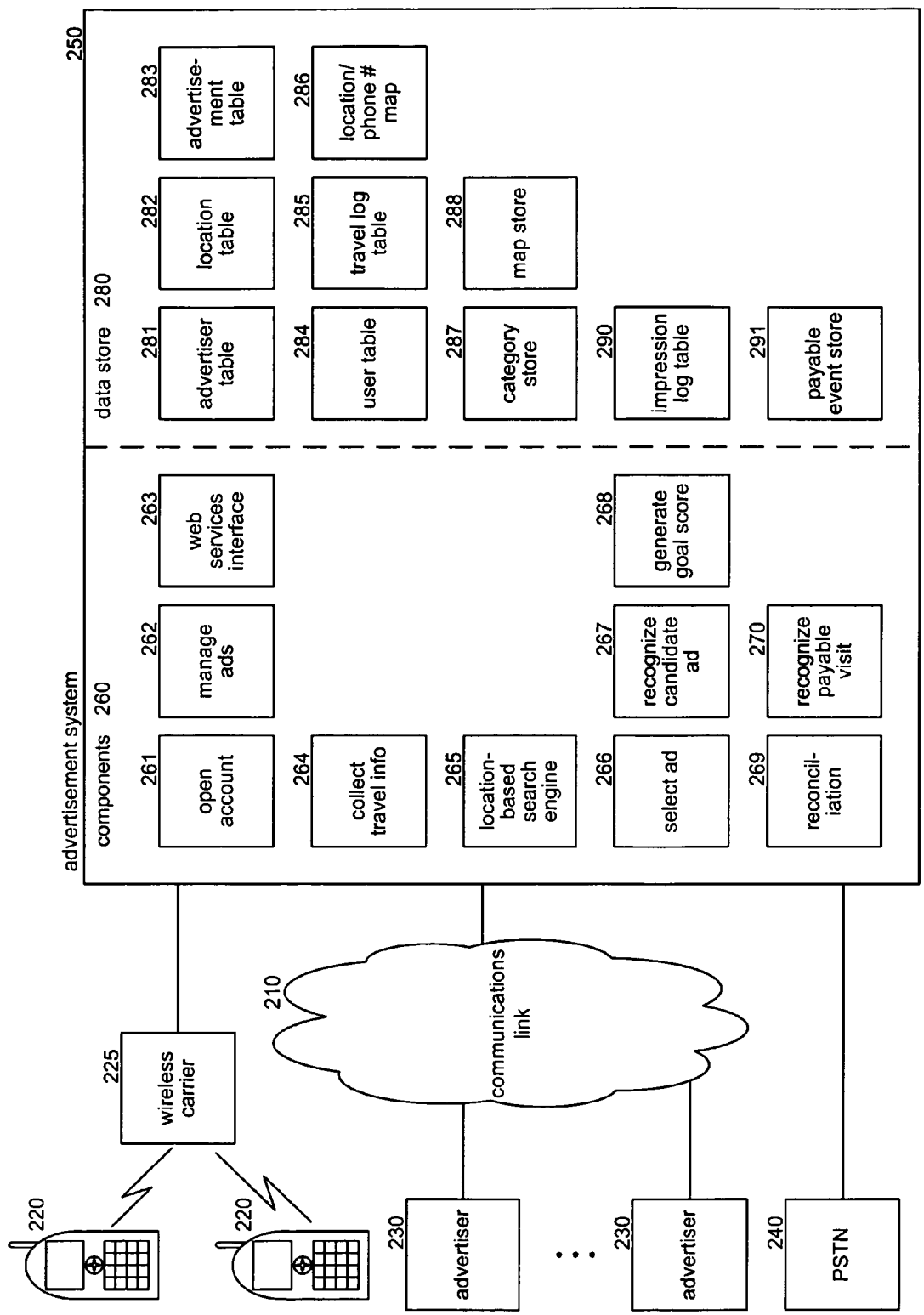
FIG. 2 is a block diagram that illustrates components of the advertisement system in one embodiment.

FIG. 2 is a block diagram that illustrates components of the advertisement system in one embodiment. The advertisement system 250 is connected via communications link, such as the Internet, 210 to various advertiser computer systems 230. The advertisement system is also connected to mobile devices 220 via wireless carrier 225 and to telephones via the public switched telephone network ("PSTN") 240. The advertisement system includes various processing components 260 and data stores 280.

The advertisement system includes an open account component 261, a manage advertisements component 262, and a web services interface component 263. The open account component provides web pages through which advertisers can open an account with the advertisement system. The open account component uses a confirmation code as described above to authenticate the visit location of an advertiser. The manage advertisements component provides web pages through which advertisers can specify advertisement plans, modify advertisement plans, review billing information, review advertising statistics, and so on. The web services interface component provides an application program interface through which advertisers can manage advertisements programmatically. Advertisers, such as a large coffee shop chain, may have hundreds of locations that they want to advertise. An advertiser may wish to control the advertising for all locations from a department located at the advertiser's headquarters. In such a case, it may be difficult for the advertiser to manually define each of the hundreds of thousands of advertisements to be used by the locations. The information technology department of the advertiser can develop programs to programmatically provide the advertisements to the advertisement system. The open account component, manage advertisement component, and web services interface component store data in and retrieve data from an advertiser table 281, a location table 282, and an advertisement table 283, which are defined in more detail in FIG. 3. When a visit location is specified, these components may identify a phone number associated with the visit location using a location/phone number map 286, which maps locations to phone numbers as provided by a trusted party that is independent of the advertiser.

The advertisement system also includes a collect travel information component 264, a user table 284, and a travel log table 285. The collect travel information component receives travel reports from the mobile devices and stores an entry for each travel report in the travel log table. The user table may contain an entry for each user that maps from phone number to user so that the advertisement system can correlate travel reports sent from a certain phone number with the correct user. The advertisement system may alternatively store a user identifier on the mobile devices and use these identifiers, instead of phone numbers, to identify the users.

The advertisement system may include a location-based search engine 265, a category store 287, and a map store 288. The search engine allows a user to browse through the categories of the category store and specify a query that includes a user location, a search category, and a search term. The search engine identifies locations near the user location that satisfy the query and invokes a select advertisement component 266 to select an advertisement to be presented with the search result. The search engine then provides to the mobile device a map of the area surrounding the user location that identifies the locations that satisfy the query and highlights the visit location associated with the selected advertisement.

The advertisement system may include the select advertisement component, a recognize candidate advertisement component 267, and a generate goal score component 268. The select advertisement component invokes the recognize candidate advertisement component to identify candidate advertisements from the advertisement table that may be presented to the user. The select advertisement component also invokes the generate goal score component to generate a goal score for each candidate advertisement. The select advertisement component then updates an impression log table 290 to indicate that the selected advertisement is being presented to the user.

The advertisement system also includes a reconciliation component 269, a recognize payable visit component 270, and a payable event store 291. The reconciliation component analyzes the impression log table and the travel log table to identify payable events such as payable visits and payable calls and records those events in the payable event store. The advertisement system may charge for an advertisement when the user calls a telephone number associated with the advertisement (e.g., to make a reservation) within a call window that may be the same as the visit window. The advertisement system may use different visit windows for different advertisements. The visit window may be specified by the advertisers or by the advertisement system. The advertisement may specify different advertisement windows for different categories of advertisements. For example, an advertisement for a coffee shop may have a visit window of 30 minutes and an advertisement for a restaurant may have a visit window that ends at the end of the day. A payable event may also include using the mobile device to help conduct a transaction (e.g., provide payment) with a merchant associated with an advertisement within the visit window or other time period.

The computing devices on which the advertisement system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the advertisement system. In addition, the data structures and message structures may be stored or transmitted via a data transmission medium, such as a signal on a communications link. Various communications links may be used, such as the Internet, a local area network, a wide area network, or a point-to-point dial-up connection. The advertisement system may provide advertisements to various devices such as personal computers, cell phones, personal digital assistants, consumer electronics, home automation devices, and so on. In some embodiments, when an advertisement is provided to a user via a non-location-aware device, the advertisement system tracks location-aware devices registered to that user to determine whether the user visited the visit location.

The advertisement system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the reconciliation component may be implemented on a mobile device or a server. Also, the administrative component (e.g., open account), the search engine, the advertisement component, and the reconciliation component, and the reconciliation component may all be hosted on different computer systems and provided by different service providers.

Figure 3:
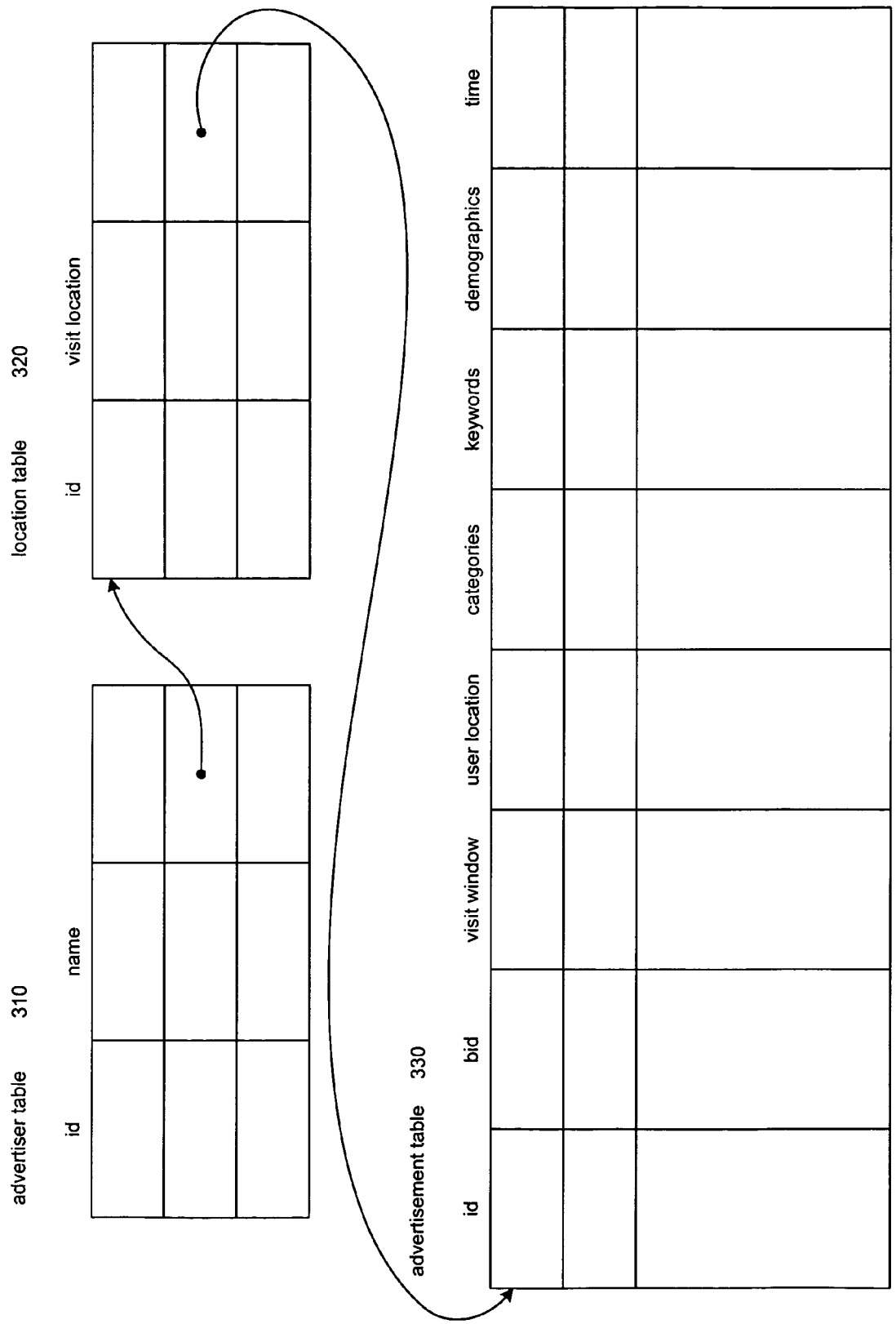
FIG. 3 is a block diagram that illustrates advertiser-related tables of the advertisement system in one embodiment.

FIG. 3 is a block diagram that illustrates advertiser-related tables of the advertisement system in one embodiment. The advertisement system may include an advertiser table 310, a location table 320 for each advertiser, and an advertisement table 330 for each location of the advertiser. The advertiser table may include an entry for each advertiser that includes an advertiser identifier, an advertiser name, and other advertiser-related information such as billing address, phone number, and so on. The advertiser table also includes a link to a location table for the advertiser. The location table identifies the visit locations associated with that advertiser. The location table may have an entry for each visit location that includes a location identifier and a visit location. Each entry may also include a link to an advertisement table that defines the advertisement plans associated with that visit location. Each entry of the advertisement table may include an advertisement identifier, a bid amount, a visit window, a user location, and placement criteria. The various tables illustrated in this description only present one possible logical view of the data of the advertisement system. The data of the advertisement system may be represented using a variety of data structures (e.g., tables, linked lists, hash tables, prefix trees). The various tables may be divided or combined in various ways. For example, the location tables of all the users may be stored in a single relational table with a user index. In addition, the data structures may be organized using various data management tools such as a SQL database or a file system. In addition, the accessing of the table is shown using a procedural access. The accessing, however, may use non-procedural techniques such as joins of a relational database.

Figure 4:
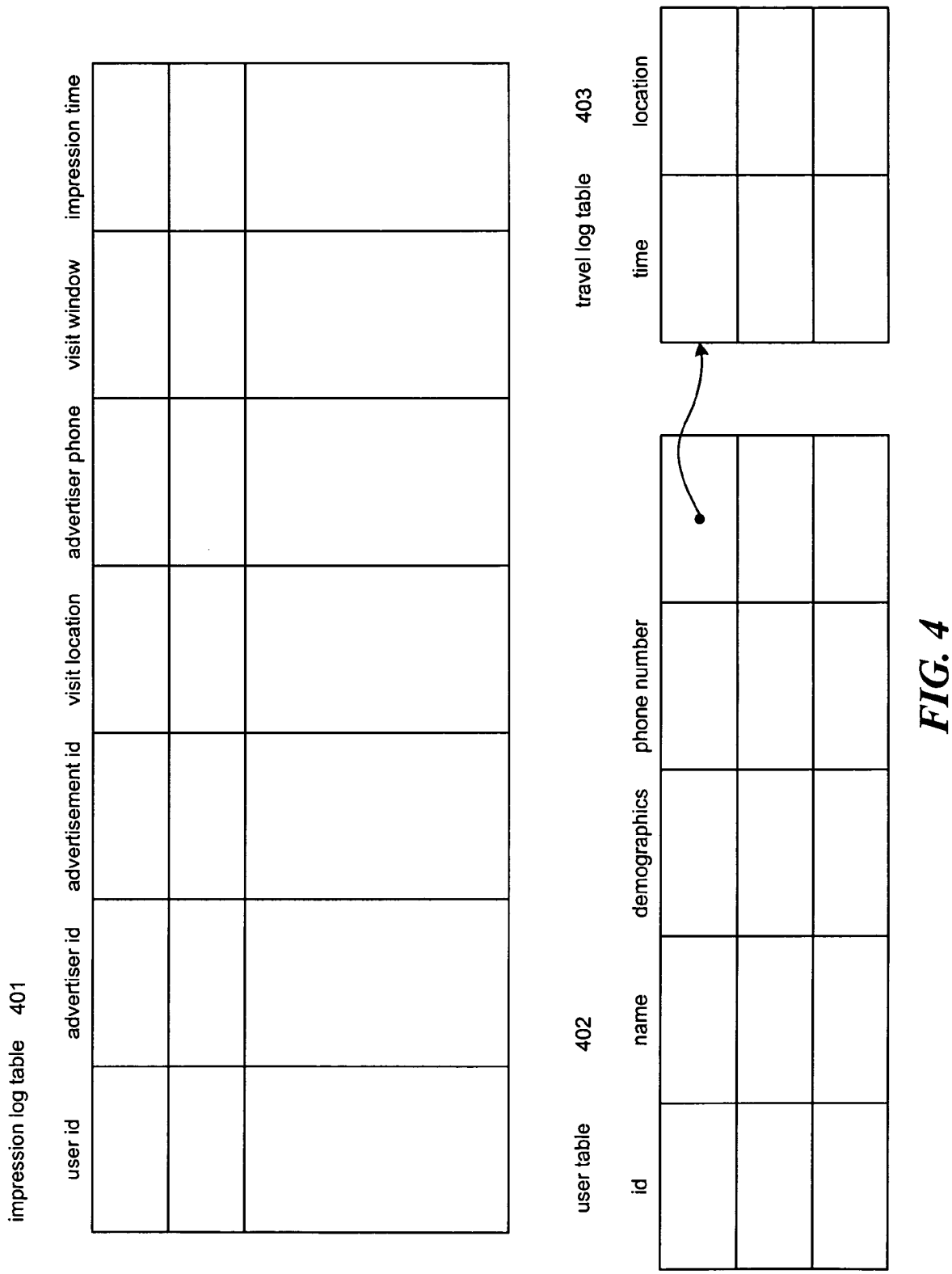
FIG. 4 is a block diagram that illustrates reconciliation-related tables of the advertisement system in one embodiment.

FIG. 4 is a block diagram that illustrates reconciliation-related tables of the advertisement system in one embodiment. The advertisement system may include an impression log table 401, a user table 402, and a travel log table 403. The impression log table includes an entry for each advertisement presented to a user. Each entry includes a user identifier, an advertiser identifier, an advertisement identifier, a visit location, an advertiser phone number, a visit window, an impression time, and so on. One skilled in the art will appreciate that the impression log table may include information that could be derived from other tables within the advertisement system, but is duplicated in the impression log table for computational efficiency. The user table includes an entry for each user that may include a user identifier, a user name, a user telephone number, user demographics, and so forth. The entries may also include a link to a travel log table for the user that includes an entry for each travel report received from a user's mobile device.

Figure 5:
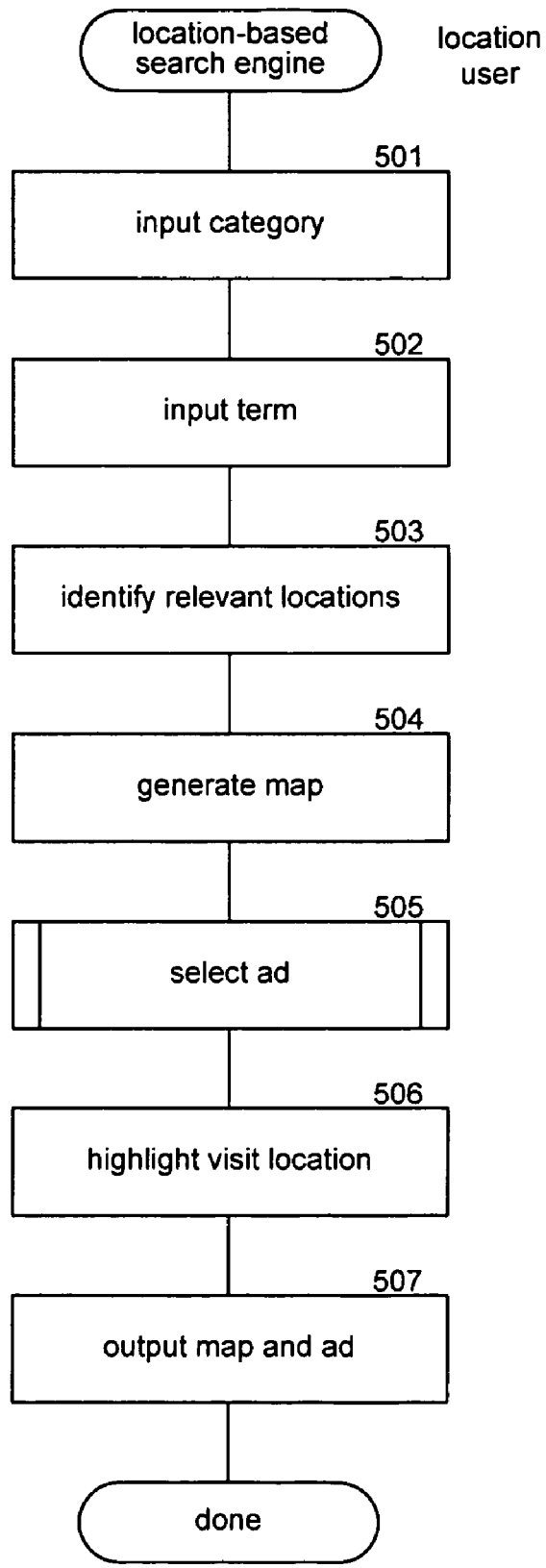
FIG. 5 is a flow diagram that illustrates the processing of a location-based search engine that interfaces with the advertisement system in one embodiment.

FIG. 5 is a flow diagram that illustrates the processing of a location-based search engine that interfaces with the advertisement system in one embodiment. The search engine may receive a user identifier and user location and input the search category and search terms from the user. In block 501, the component inputs the search category from the mobile device. In block 502, the component inputs the search terms from the mobile device. In block 503, the component identifies advertiser locations that are relevant to the search category and the search terms and that are near the user location. In block 504, the component generates a map for the area surrounding the user location. In block 505, the component invokes the select advertisement component to select an advertisement to be included with the search result. In block 506, the component highlights the visit location of the selected advertisement on the map. In block 507, the component outputs the map and the advertisement to the mobile device and then completes.

Figure 6:
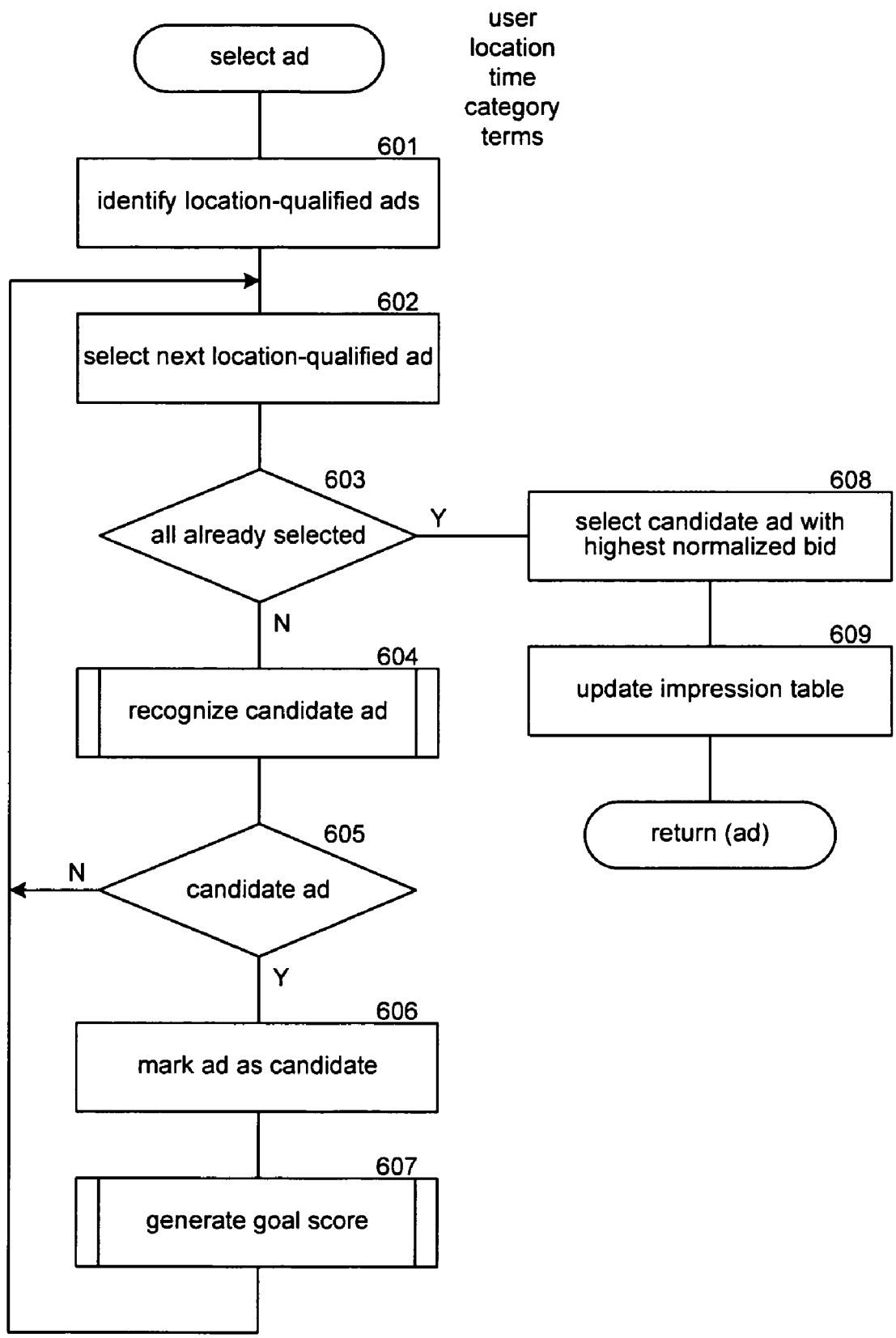
FIG. 6 is a flow diagram that illustrates the processing of the select advertisement component of the advertisement system in one embodiment.

FIG. 6 is a flow diagram that illustrates the processing of the select advertisement component of the advertisement system in one embodiment. The component is passed a user identifier and a query, which includes a user location, a search category, an optional search time, and the search terms. The optional search time is either the time at which the search was conducted, or a future time selected by a user who is planning ahead. In block 601, the component identifies location-qualified advertisements. A location-qualified advertisement is an advertisement whose visit location is near the user location. In blocks 602-607, the component loops determining whether each location-qualified advertisement is a candidate advertisement and if so, generates a goal score for that advertisement. In block 602, the component selects the next location-qualified advertisement. In decision block 603, if all the location-qualified advertisements have already been selected, then the component continues to block 608, else the component continues at block 604. In block 604, the component invokes the recognize candidate advertisement component. In decision block 605, if the selected advertisement is a candidate advertisement, then the component continues at block 606, else the component loops to block 602 to select the next location-qualified advertisement. In block 606, the component marks the selected advertisement as a candidate advertisement. In block 607, the component invokes the generate goal score component to generate a goal score for the candidate advertisement. The component then loops to block 602 to select the next location-qualified advertisement. In block 608, the component selects the candidate advertisement with the highest goal score. In block 609, the component updates the impression log table to indicate that the selected advertisement is being presented to the user. The component then returns an indication of the selected advertisement.

Figure 7:
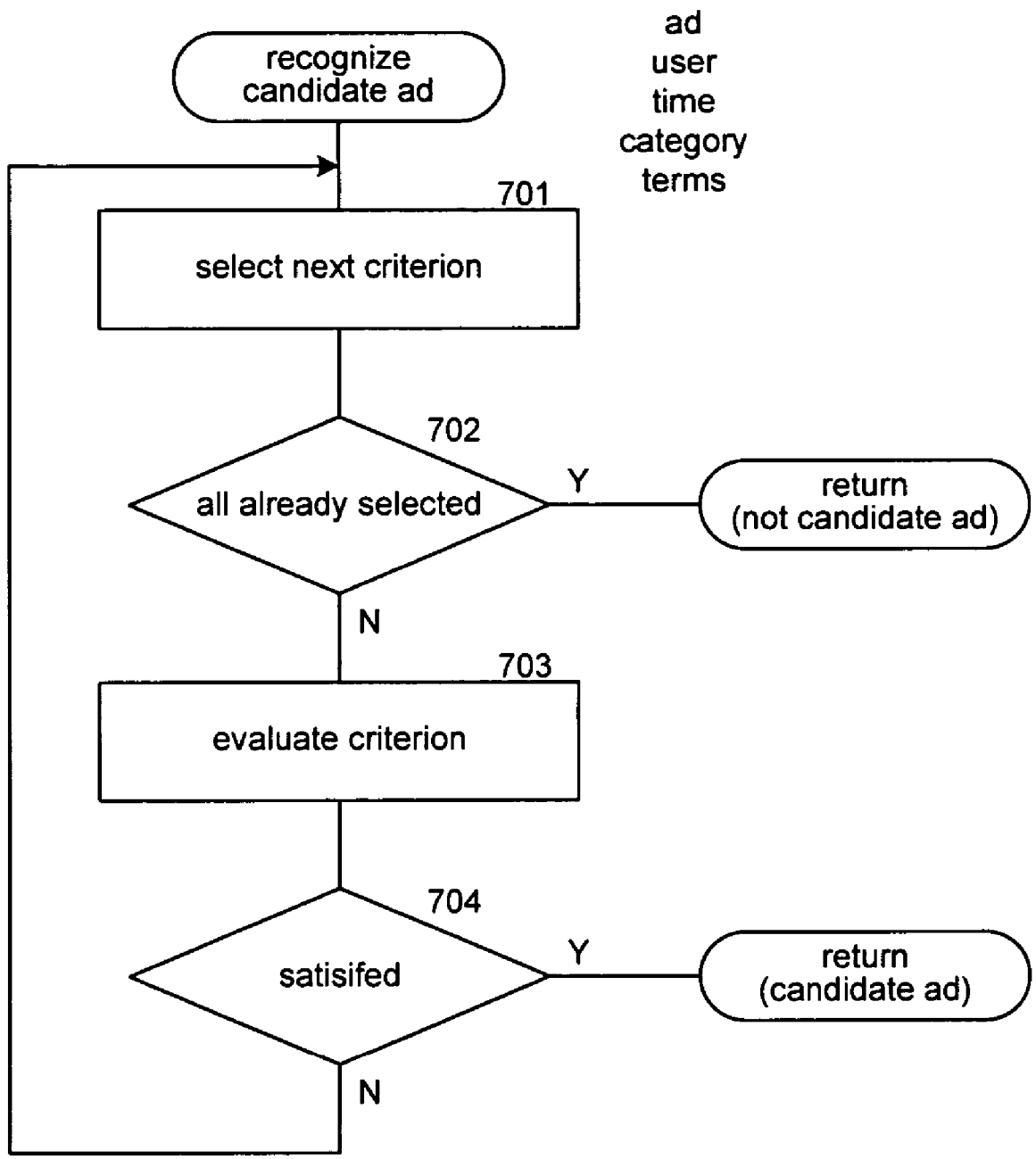
FIG. 7 is a flow diagram that illustrates the processing of the recognize candidate advertisement component of the advertisement system in one embodiment.

FIG. 7 is a flow diagram that illustrates the processing of the recognize candidate advertisement component of the advertisement system in one embodiment. The component is passed an indication of an advertisement, a user, a category, a query time, and a term and determines whether the advertisement is a candidate advertisement. In one embodiment, the advertisement system may have placement criteria associated with each advertisement. If one of the criteria is satisfied, then the advertisement is a candidate advertisement. For example, a criterion may be that the user is between 21 and 29 years old, the search category is "apparel," and the search term is "casual." Another criterion for the same advertisement may be that the user is between 40 and 60 years old, the search category is "apparel" or "kitchen," and the search term is "gift." The advertisement may accept any combination of Boolean operators (e.g., AND, OR, XOR, NOT) to allow an advertisement criterion to be of arbitrary complexity. In block 701, the component selects the next criterion for the advertisement. In decision block 702, if all the criteria have already been selected, then the component returns an indication that the advertisement is not a candidate advertisement, else the component continues at block 703. In block 703, the component evaluates the selected criterion. In block 704, if the selected criterion is satisfied, then the component returns an indication that the advertisement is a candidate advertisement, else the component loops to block 701 to select the next criterion.

Figure 8:
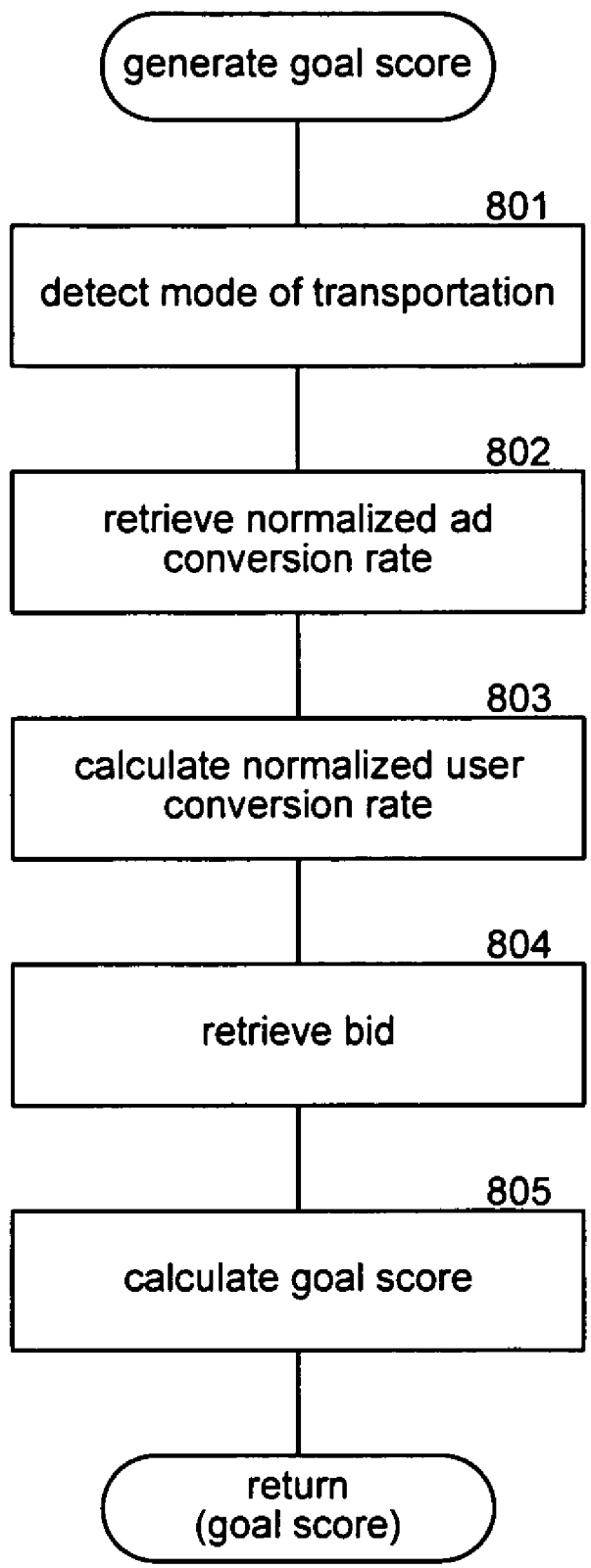
FIG. 8 is a flow diagram that illustrates the processing of the generate goal score component of the advertisement system in one embodiment.

FIG. 8 is a flow diagram that illustrates the processing of the generate goal score component of the advertisement system in one embodiment. The component is passed an indication of a candidate advertisement and generates a goal score.

The component may factor in various attributes of the user, the advertisement, the advertiser, and so on in generating a goal score amount that represents the value of selecting the advertisement for the current placement opportunity. The attributes may include travel history of the user, search history of the user, user conversion rate, and so on. In block 801, the component detects the mode of transportation of the user based on the current speed of travel. The mode of transportation may affect the goal score in various ways. For example, if the mode of transportation is automobile, then the advertisement system may decrease goal score for a visit location that was just passed by the user on the assumption that a person in an automobile is less likely to reverse directions than continue in the same direction. In block 802, the component retrieves a normalized advertisement conversion rate for the advertisement. An advertisement conversion rate reflects the rate at which users in general visit the visit location of that advertisement within the visit window. A normalized advertisement conversion rate reflects an adjustment that may be based on various factors such as relative newness of the advertisement, overall conversion rate of the advertiser's advertisement, and so on. In block 803, the component calculates a normalized user conversion rate. A user conversion rate indicates the likelihood that the user will visit the visit location within the visit window based on past experience. A normalized user conversion rate reflects an adjustment that may be based on average current speed of travel, direction of travel, and so on. In block 804, the component retrieves the bid amount for the advertisement. In block 805, the component calculates a goal score amount based on the various factors. For example, the component may map each factor to a number between 0 and 1 and linearly combine the numbers using weighting factors. The component then returns the goal score.

Figure 9:
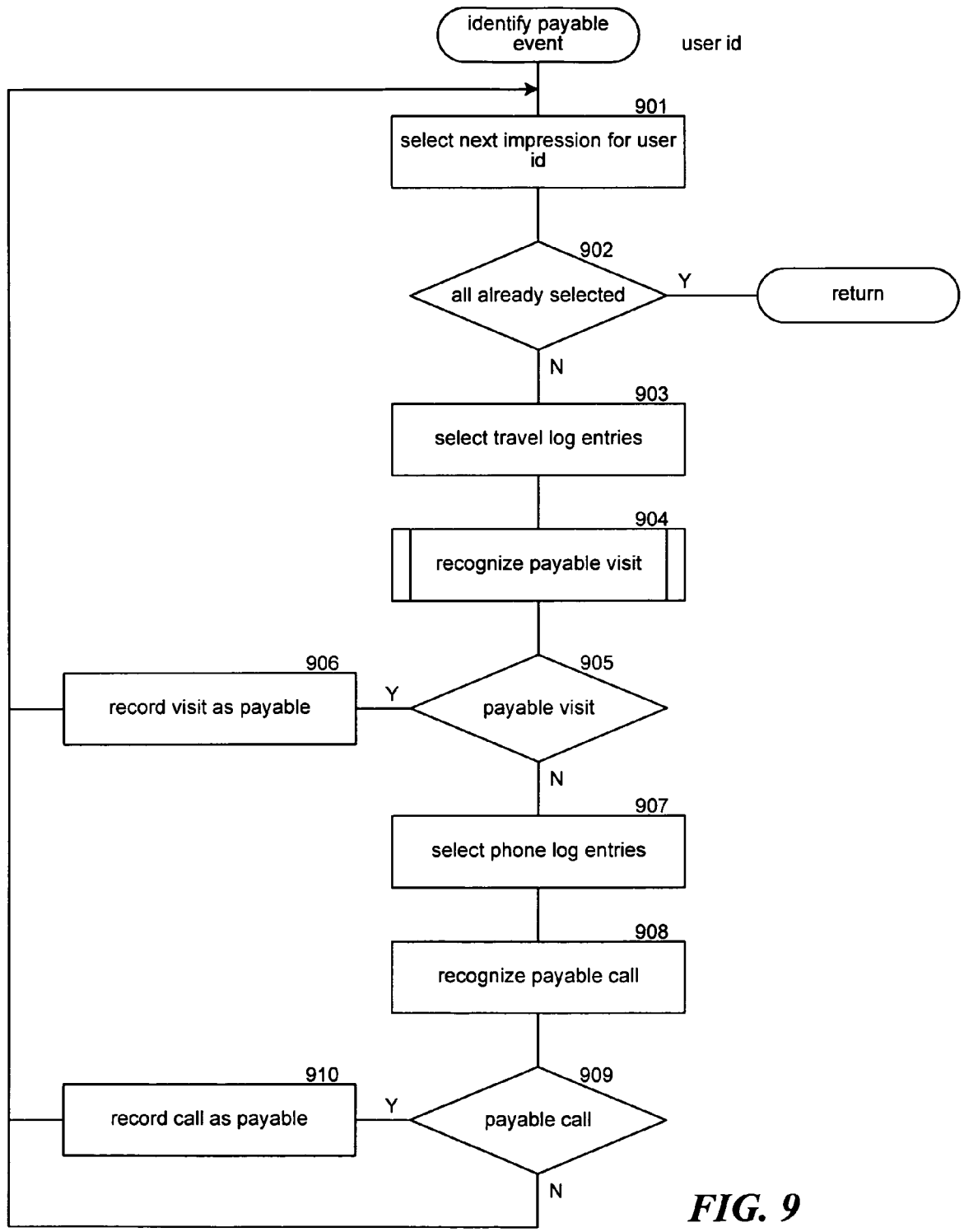
FIG. 9 is a flow diagram that illustrates the processing of the identify payable event component of the advertisement system in one embodiment.

FIG. 9 is a flow diagram that illustrates the processing of the identify payable event component of the advertisement system in one embodiment. The component identifies payable events such as a visit to a visit location or a call to an advertiser number within a visit window. The component loops determining whether each impression log entry for the user has a corresponding payable event. In block 901, the component selects the next impression log entry for the user. In decision block 902, if all the impression log entries have already been selected, then the component returns, else the component continues at block 903. In block 903, the component selects travel log entries from just before the impression time to just after the expiration of the visit window. In block 904, the component invokes the recognize payable visit component to determine whether a payable visit occurred within the visit window. In decision block 905, if a payable visit did occur, then the component continues at block 906, else the component continues at block 907. In block 906, the component records that the visit is payable and then loops to block 901 to select the next impression log entry. In block 907, the component selects the phone log entries within the visit window. The phone log contains an entry for each call made by the user. In block 908, the component determines whether a payable call occurred within the visit window. In decision block 909, if a payable call occurred, then the component continues at block 910, else the component loops to block 901 to select the next impression log entry. In block 910, the component records the call as payable and then loops to block 901 to select the next impression log entry.

Figure 10:
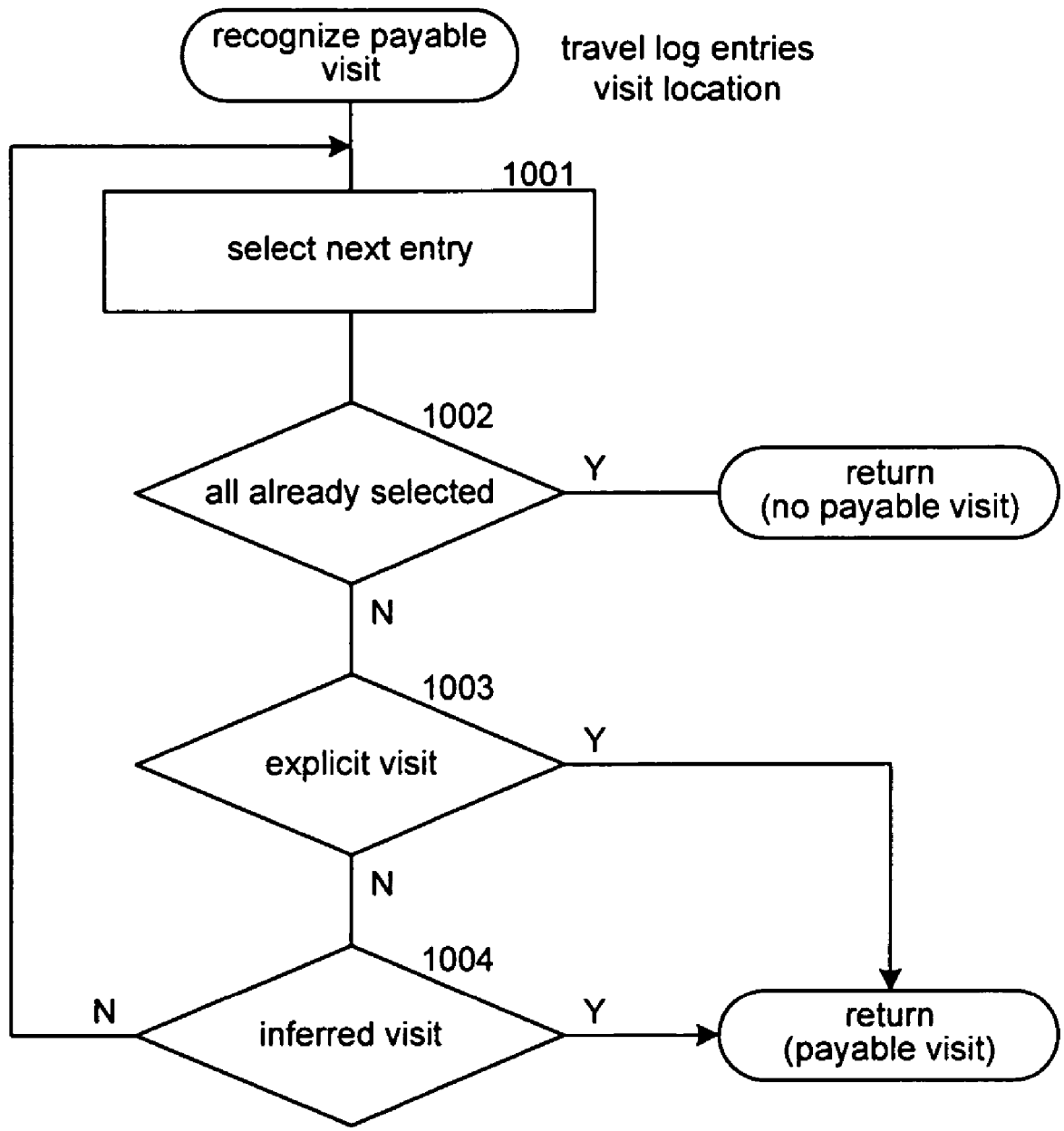
FIG. 10 is a flow diagram that illustrates the processing of the recognize payable visit component of the advertisement system in one embodiment.

FIG. 10 is a flow diagram that illustrates the processing of the recognize payable visit component of the advertisement system in one embodiment. The component determines whether a payable visit is associated with the presenting of an advertisement. The advertisement system may use various techniques to determine whether a user traveled to the visit location based on the travel log. For example, the advertisement system may use an explicit test in which a travel report indicates that the user was within the visit location. The advertisement system may also use an inferred visit test in which the visit is inferred in absence of an explicit visit. For example, a travel log may indicate that a user was just outside the visit location at time t and again at time t+5 minutes with no intervening travel records, as the user may have turned off their cellular phone or lost connectivity to the GPS system or wireless network when entering the visit location. In such cases, the advertisement system may infer that the user did go into the visit location. As another example, if the advertisement system detects that the user was within a certain threshold distance of the visit location for an extended time, then the advertisement system may infer that the user traveled to that visit location and that the failure to be within the visit location may be a result of inaccuracies in the user location or in the visit location. The component is passed travel log entries that may represent time just before the impression time and just after the visit window to account for the possibility that the user went within the visit location immediately upon being presented with the advertisement or just before the expiration of the visit window. In block 1001, the component selects the next travel log entry. In decision block 1002, if all the travel log entries have already been selected, then the component returns an indication that no payable visit occurred, else the component continues at block 1003. In decision block 1003, if an explicit visit occurred, then the component returns an indication that a payable visit occurred, else the component continues at block 1004. In decision block 1004, if an inferred visit occurred, then component returns an indication that a payable visit occurred, else the component loops to block 1001 to select the next travel log entry.

Rather than rely upon travel log entries to determine that a user visited a business premise, the advertisement system may also rely upon other techniques to explicitly or implicitly determine that a visit to the business occurred. For example, it may be confirmed that a user visited a business by the exchange of a signal between the mobile device and one or more beacon devices that are installed on the premises of the business. The beacon and mobile devices may use any of a number of various short-range wireless technologies (such as Bluetooth, ZigBee, RFID, or equivalent) to exchange a unique code or other signal that is associated with the business or with the wireless device. In one embodiment, the mobile device might receive a unique code of the business from the beacon device and create a log entry that would subsequently be communicated to the recognize payable visit component to confirm that the user traveled to the business location. In another embodiment, the mobile device might transmit a unique code that would be detected by the beacon and subsequently communicated to the advertising system via a wired or wireless network. An advantage of having the beacon periodically communicate a report of identified wireless devices that visited the premises of the business is that such a system prevents a business owner from disabling or otherwise tampering with the beacon, since the absence of a periodic report would indicate to the advertisement system operator that the beacon may no longer be functioning correctly. Those skilled in the art will appreciate that certain handshaking and other communications may also be made between the mobile device and the beacon device as part of the identification process, and that either device could initiate the communication regardless of which ultimately communicates with the recognize payable visit component. As previously discussed, another example of an event that could be used to confirm that the user visited the business would be a financial transaction that the user completed while at the business. Such transaction could be based on the use of the mobile device to conduct the transaction, an automatic correlation of a user's credit-card activity at the business with the use records of the wireless device, or the manual entering of a unique code by the business as part of the check-out process in order to redeem a coupon transmitted to the user via the mobile device.

Figure 11:
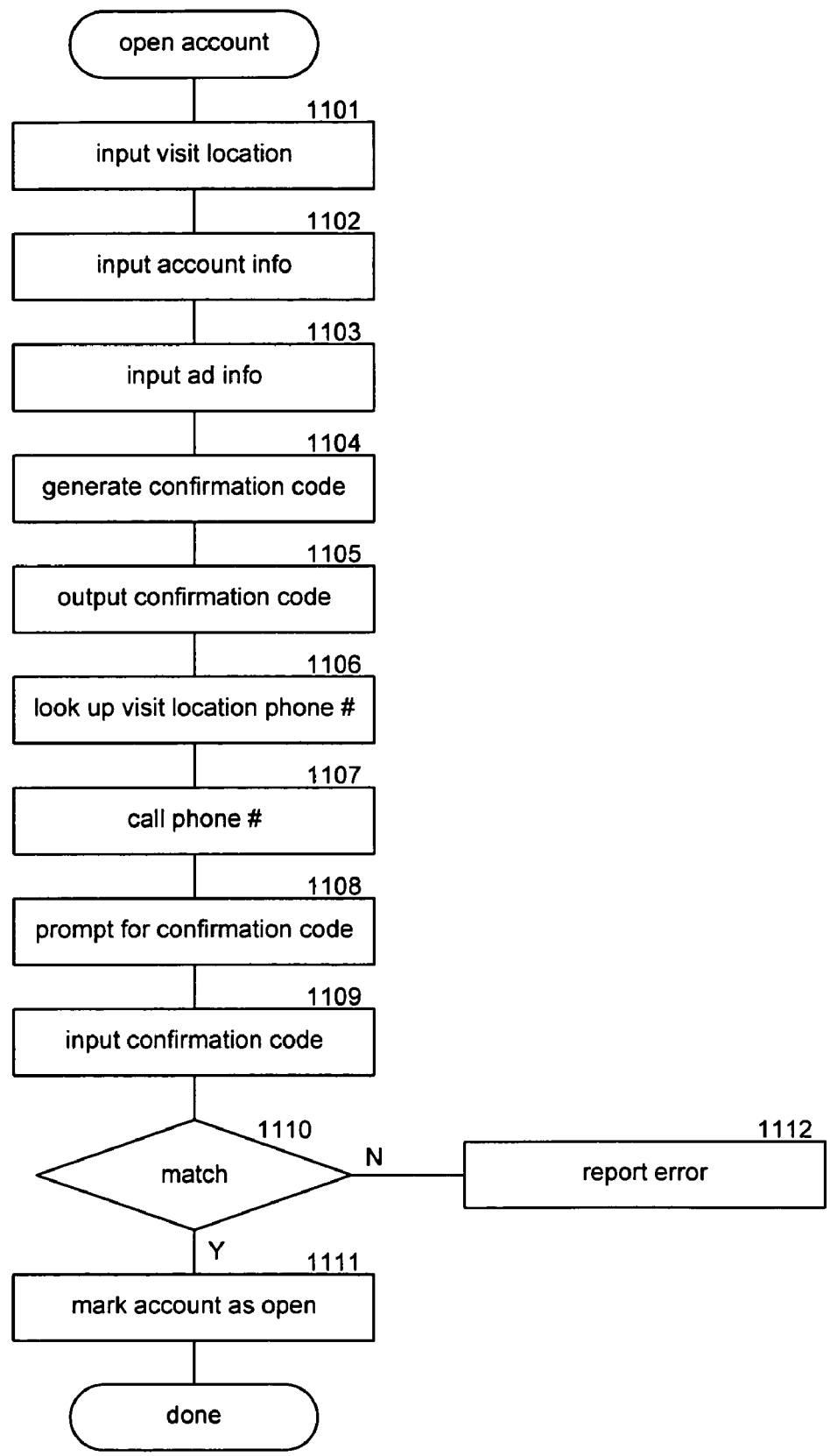
FIG. 11 is a flow diagram that illustrates the processing of the open account component of the advertisement system in one embodiment.

FIG. 11 is a flow diagram that illustrates the processing of the open account component of the advertisement system in one embodiment. In block 1101, the component inputs a visit location or business location from an advertiser. In block 1102, the component inputs account information from the advertiser which may include a user name and password. After the account is open, the advertiser can use the user name and password to update account information and advertisement plans for that visit location without having to go through the phone-call based authentication process. The advertisement system, however, may require phone-call based re-authentication when the advertiser defines a new visit location. In block 1103, the component may input advertisement plans from the advertiser. In block 1104, the component generates a random confirmation code. In block 1105, the component provides the confirmation code to the advertiser and notifies the advertiser that a call will be placed to the telephone number associated with the visit location and that the advertiser needs to input that confirmation code to complete the opening of the account. The advertisement system may also generate a random text message and provide that to the advertiser along with an indication that the advertisement system will recite that text message to the advertiser when the call is made as a guarantee that it is indeed the advertisement system that is placing the call in response to the specific ongoing dialog between the advertisement system and the advertiser. In block 1106, the component looks up a phone number associated with that visit location. In block 1107, the component places a call to that phone number. In block 1108, the component may provide the text message and prompt for the confirmation code. In block 1109, the component may input the confirmation code from the answering party. In decision block 1110, if the confirmation code matches, then the component continues at block 1111, else the component continues at block 1112. In block 1111, the component marks the account as open and then completes. In block 1112, the component reports an error and then completes. The advertisement system may also use a phone-call based authentication technique to ensure that a person opening an account for an advertiser is a representative of the advertiser. For example, the advertisement system may look up a phone number for the advertiser's main business location (i.e., assuming different from the visit location) and call that phone number and request a confirmation code.

From the foregoing, it will be appreciated that specific embodiments of the invention have been described herein for purposes of illustration, but that various modifications may be made without deviating from the spirit and scope of the invention. In one embodiment, the advertisement location may present an advertisement to a user via one device and then track the travel of the user via a separate device. For example, the advertisement system may provide the advertisement to a user at their home computer and the track the user's travel using a cellular phone or GPS device. Also, the term "advertiser" refers to any entity that may want to advertise, such as a person, an educational institution, a company, a business, a nonprofit organization, a government agency, and so on. Accordingly, the invention is not limited except as by the appended claims.

We claim:

1. A system for creating a pay-for-visit account for an advertiser, comprising:
a processor; and
one or more components that are configured to, when executed by the processor:
receive information from the advertiser about the pay-per-visit account and about a visit location;
identify a telephone number associated with the visit location independently of any telephone number information supplied by the advertiser;
place a call to the identified telephone number and obtain confirmation from an answering party to open the pay-per-visit account; and
complete creation of the pay-per-visit account in response to obtaining the confirmation from the answering party.

2. The system of claim 1 wherein the one or more components are further configured to, when executed by the processor, provide a confirmation code, and prompt the answering party for the confirmation code as part of obtaining confirmation to open the pay-per-visit account.

3. The system of claim 2 wherein the one or more components are part of an advertising system and are further configured to generate the confirmation code before the providing of the confirmation code.

4. The system of claim 3 wherein the one or more components are further configured to not complete the creation of the pay-per-visit account if the confirmation is not obtained from the answering party.

5. The system of claim 3 wherein the one or more components of the advertising system each includes software instructions for execution by the processor.

6. The system of claim 2 further comprising an additional component that is configured to, when executed by the processor, charge the advertiser for a visit of a mobile device to the visit location after the mobile device has been provided with an advertisement of the advertiser.

7. A computer-implemented method comprising:
receiving, by one or more programmed computer systems, information from an advertiser about an account to be opened and about an associated visit location;
identifying, by the one or more programmed computer systems and independently of any telephone number information supplied by the advertiser, a telephone number associated with the visit location;
placing, by the one or more programmed computer systems, a call to the identified telephone number and obtaining confirmation from an answering party to open the account; and
completing, by the one or more programmed computer systems, creation of the account in response to obtaining the confirmation from the answering party.

8. The computer-implemented method of claim 7 further comprising performing interactions with the advertiser that include providing a confirmation code to the advertiser, wherein the receiving of the information from the advertiser is part of the interactions, and wherein the obtaining of the confirmation from the answering party includes prompting the answering party for the confirmation code.

9. The computer-implemented method of claim 8 wherein the interactions with the advertiser occur via one or more web pages, and wherein the received information from the advertiser includes at least one of a business name and of a business location indicated on a map.

10. The computer-implemented method of claim 7 wherein the one or more programmed computer systems are part of an advertising system.

11. The computer-implemented method of claim 7 further comprising not completing the creation of the account if the confirmation is not obtained from the answering party.

12. The computer-implemented method of claim 7 further comprising, after the creation of the account, charging the advertiser based on an advertisement of the advertiser that is provided to a user.

13. The computer-implemented method of claim 12 wherein the created account is a pay-for-visit account, wherein the visit location corresponds to a business of the advertiser, and wherein the charging of the advertiser is further based on a visit of a mobile device of the user to the visit location of the advertiser.

14. The computer-implemented method of claim 12 wherein the charging of the advertiser is further based on the user calling a specified telephone number associated with the advertisement.

15. The computer-implemented method of claim 12 wherein the charging of the advertiser is further based on the user participating in a financial transaction with a business corresponding to the visit location.

16. The computer-implemented method of claim 7 wherein the identifying of the telephone number associated with the visit location includes retrieving information from a mapping of business locations to telephone numbers.

17. A non-transitory computer-readable storage medium having stored contents that configure a computer system to perform a method, the method comprising:
   receiving, by the configured computer system, information for an advertiser about an account to be opened and about an associated visit location;
   identifying, by the configured computer system and independently of any telephone number information supplied for the advertiser, a telephone number associated with the visit location;
   using, by the configured computer system, the identified telephone number to contact an answering party and obtaining confirmation from the answering party to open the account; and
   completing, by the configured computer system, creation of the account in response to obtaining the confirmation from the answering party.

18. The non-transitory computer-readable storage medium of claim 17 wherein the method further comprises performing interactions with the advertiser that include providing a confirmation code to the advertiser, wherein the receiving of the information from the advertiser is part of the interactions, and wherein the obtaining of the confirmation from the answering party includes prompting the answering party for the confirmation code.

19. The non-transitory computer-readable storage medium of claim 18 wherein the interactions with the advertiser occur via one or more web pages, and wherein the received information from the advertiser includes at least one of a business name and of a business location indicated on a map.

20. The non-transitory computer-readable storage medium of claim 17 wherein the configured computer system is part of an advertising system.

21. The non-transitory computer-readable storage medium of claim 17 wherein the method further comprises not completing the creation of the account if the confirmation is not obtained from the answering party.

22. The non-transitory computer-readable storage medium of claim 17 wherein the method further comprises, after the creation of the account, charging the advertiser based on an advertisement of the advertiser that is provided to a user.

23. The non-transitory computer-readable storage medium of claim 22 wherein the created account is a pay-for-visit account, wherein the visit location corresponds to a business of the advertiser, and wherein the charging of the advertiser is further based on a visit of a mobile device of the user to the visit location of the advertiser.

24. The non-transitory computer-readable storage medium of claim 22 wherein the charging of the advertiser is further based on the user calling a specified telephone number associated with the advertisement.

25. The non-transitory computer-readable storage medium of claim 22 wherein the charging of the advertiser is further based on the user participating in a financial transaction with a business corresponding to the visit location.

26. The non-transitory computer-readable storage medium of claim 17 wherein the identifying of the telephone number associated with the visit location includes retrieving information from a mapping of business locations to telephone numbers.

27. The non-transitory computer-readable storage medium of claim 17 wherein the method further comprises, before the obtaining of the confirmation from the answering party, providing a generated text message to the advertiser.

28. The non-transitory computer-readable storage medium of claim 17 wherein the using of the identified telephone number to contact the answering party includes providing a generated text message to the answering party.

29. The non-transitory computer-readable storage medium of claim 28 wherein the using of the identified telephone number to contact the answering party further includes placing a call to the identified telephone number, and wherein the generated text message provided during the placed call confirms previously provided information.

\* \* \* \* \*